United States Patent [19]

Jakobsen

[11] 4,333,904

[45] Jun. 8, 1982

[54] FORMING A MOUTHPIECE ON A PREFORM

[75] Inventor: Kjell M. Jakobsen, Skanör, Sweden

[73] Assignee: PLM AB, Malmo, Sweden

[21] Appl. No.: 182,086

[22] Filed: Aug. 28, 1980

Related U.S. Application Data

[63] Continuation of Ser. No. 15,961, Feb. 28, 1979, abandoned.

[30] Foreign Application Priority Data

Mar. 2, 1978 [SE] Sweden .................................. 7802362

[51] Int. Cl.³ ........................ B29C 17/00; B29C 17/07
[52] U.S. Cl. ..................................... 264/323; 264/533;
264/296; 264/322; 425/525; 425/535; 425/392
[58] Field of Search ............... 264/533, 296, 322, 323;
425/525, 535, 392, 393

[56] References Cited

U.S. PATENT DOCUMENTS

| | | | |
|---|---|---|---|
| 3,311,950 | 4/1967 | Strauss | 264/533 X |
| 3,466,702 | 9/1969 | Stenger | 264/533 X |
| 3,478,913 | 11/1969 | Kemp | |
| 3,817,677 | 6/1974 | Seefluth | |
| 3,969,060 | 7/1976 | Rosenkranz et al. | 425/525 |
| 3,989,786 | 11/1976 | Mehnert et al. | 425/535 X |
| 4,115,496 | 9/1978 | Krall | 264/533 |

FOREIGN PATENT DOCUMENTS

| | | |
|---|---|---|
| 57688 | 7/1889 | Fed. Rep. of Germany. |
| 2715897 | 11/1977 | Fed. Rep. of Germany. |
| 1502313 | 11/1967 | France. |
| 2045105 | 2/1971 | France. |
| 1602863 | 3/1971 | France. |
| 542705 | 11/1973 | Switzerland. |
| 1202962 | 8/1970 | United Kingdom. |
| 1252548 | 11/1971 | United Kingdom. |

Primary Examiner—Jan H. Silbaugh
Attorney, Agent, or Firm—Hane, Roberts, Spiecens & Cohen

[57] ABSTRACT

A process for forming a mouthpiece on a preform formed from a tubular blank consisting of thermoplastic material, which is intended for the production of a container, e.g. by blow molding, whereby connecting means, such as a thread, which is adapted to a suitable form of closure of the container is formed on the outside of the mouthpiece. The process comprises inserting the blank between an outer mold section with a mold portion for the attachment surface of the connecting means and an inner mold section, whereupon a driven relative axial movement of the two mold sections relative to each other forces the material of the blank, in tightly enclosed manner, radially outwards into the mold portion for the attachment surface, and an axial head cup is provided.

9 Claims, 2 Drawing Figures

FORMING A MOUTHPIECE ON A PREFORM

This is a continuation of application Ser. No. 15,961, filed Feb. 28, 1979, now abandoned.

FIELD OF THE INVENTION

The invention relates to a process for forming a mouthpiece on a preform when re-forming a preferably tubular blank consisting of thermoplastic material, which is intended for the production of a container, e.g. by blow molding. The process is carried out so that on the outside of this mouthpiece, connecting means, such as a thread, which are adapted to a suitable form of closure for the container and/or serve to clamp the preform, are formed by inserting the blank between an outer mold section with a mold for the attachment surface of the connecting means and an inner mold section, whereupon a driven relative axial movement of the two mold sections relative to each other forces the tightly enclosed material of the blank radially outwards into the mold for the attachment surface, and an axial head cup is provided.

PRIOR ART

A process of the kind described above is known from DT OS No. 2 715 897. In this case, the inner cavity of a blank of tubular cross section which receives a cylindrical mandrel is sealed off by a pressing shoulder and the material of the blank is forced outwards into a mold for a thread. The blank is axially supported by a head cup. In contrast to the solution according to CH PS No. 542 705, there is no waste of material caused by trimming the finished preform. However, there is the disadvantage that the wall thickness of the threaded mouthpiece remains the same in comparison with the wall thickness of the container subsequently formed by blow molding and is thus much too thick. Quite apart from the unattractively large dimensions, this also means that material is wasted, which becomes an important consideration in mass production.

On the other hand, U.S. Pat. No. 3,649,150 describes an inner mold section which increases the internal diameter of the blank from 0.55 to 0.60 inches on axial movement in the region of the thread on the mouthpiece. Thus, the wall thickness decreases from 0.15 to 0.125 inches, i.e. only about 8% of the material of the mouthpiece is displaced, preferably in the radial direction. If this 8% adds up to more material than the mold can hold, this material passes into grooves provided on the cylindrical part of a mandrel and is lost, or else it is forced into a space inside the internal diameter of the blank, which according to FIG. 3 is moved up to a cylindrical mandrel of only 0.49 inches and according to FIG. 4 moves into a conical part of this space and doubtless disrupts the subsequent blow molding process as a result of the increase in wall thickness. This material does not participate in any process of elongation; in fact, obviously, a separate elongation apparatus is provided which requires a corresponding gripping and pulling device. This is complicated and disadvantageous, all the more so as the receiving space which is open at the top for the blank cannot produce a clearly defined shape for the actual mouthpiece.

SUMMARY OF THE INVENTION

An object of the invention is to eliminate these disadvantages and, in a process of the type described hereinbefore, save as much as possible of the relatively expensive raw materials, with a view to mass production, and to subject the re-formed volume of material to elongation in the finished preform. In particular, in the mouthpiece, the wall thickness of the preform should be no greater than is necessary to meet the requirements for inherent stability and resistance and ensure satisfactory filling of the mold for the attachment surfaces of the connecting means, i.e. the thread for the closure. This thread is subjected to great stress when used in containers for carbonated liquids. According to the invention, this object is achieved in that the inner mold section comprises a conventional conical surface which conveys the material radially into the mold for the attachment surface and encloses an angle of 3° to 8° with the axis thereof, and when the two mold sections are axially moved relative to each other beyond the region of the mold, deforms more than 10% of the cross section of the blank on its inside, as a result of which this material, now more concentrated, is moved not only radially but also axially towards the container for blow-molding while a slightly conical mandrel adjoining the conical surface prevents the displaced material from passing into the cavity of the internal diameter of the tubular blank, thus ensuring that the blank becomes correspondingly elongated during reforming and the resulting preform is displaced, in tightly enclosed manner, over the entire length of the inner mold section. Compared with the solution according to DT OS No. 2 715 897, the process according to the invention has the advantage that, not only is the mold filled with material under pressure, but that the material from the mouthpiece, now having a thinner wall thickness in the preform, is fed into the region of the container to be blow molded in a manner which ensures that this material is used to the fullest extent. In contrast to the solution according to US PS No. 3 649 150, the pressure attained by sealing off the cavity which is to receive the preform permits clean, resistant forming of the actual mouthpiece and threads, while the smooth surfaces obtained by elongation of the tubular blanks are shaped to form a rounded mouthpiece. For this purpose, it is proposed, according to a further feature of the invention, that the elongation of the preform, or the sealed enclosure thereof, for the inner mold section, be effected along the mandrel, along the conical surface, a cylindrical surface adjacent thereto and a sealing flange, or, for the outer mold section, along an inner cylindrical surface projecting over the mandrel and along a sealing flange. The sealing flanges comprise cylindrical, tight-fitting mating surfaces which merge with rounded surfaces into the cylindrical surfaces so that a rounded, finless mouth is obtained when molding is carried out.

In addition to a thread for receiving a closure for the container, the attachment surface of the mold may form a pattern on the mouthpiece which acts as a friction surface for fixing the preform obtained from the blank. A pattern of this kind can also be used to fix the preform, without any other connecting means.

According to an advantageous feature, the head cup receives the axial forces from the blank only during the start of deformation of this blank, and is moved aside by suitable drive means as soon as the preform being produced has been fixed to the attachment surface of the outer mold section by the material passing into the mold. This has the additional advantage that the preform can become elongated without disruption and the subsequent blow molding operation is restricted only by the mold provided for this purpose.

The use of the finished containers for storing food and liquids under pressure requires relatively expensive materials, for which the saving in materials achieved here is of particular importance. Thus, the proper choice of materials and the use of the correct processing temperature plays a large part in the process according to the invention. Suitable materials for the tubular blank include polyethylene terephthalate, polyhexamethylene adipamide, polycaprolactam, polyhexamethylene sebacamide, polyethylene-2,6- and -1,5-naphthalate, polytetramethylene-1,2-dioxybenzoate and copolymers of ethylene terephthalate, ethylene isophthalate or other similar polymer plastics, and the blank is processed to form the preform at a temperature below the glass transition temperature.

BRIEF DESCRIPTION OF THE DRAWING

The invention is hereinafter described more fully with reference to two Figures, wherein.

DETAILED DESCRIPTION

When producing containers from thermoplastic materials, these containers are formed in two steps, the first of which comprises manufacturing a preform from a blank while the second comprises re-forming the preform into a finished container. The blank 10 is obtained by extruding a tube which is cooled rapidly so that the material is in an amorphous state after extrusion. The extruded tube is divided into sections of a specific length. The blanks 10 thus produced are sealed off at one end by an apparatus at a suitable stage of the process before the blow-molding of the container. After a mouthpiece has been formed so as to obtain connecting means on the mouthpiece, these connecting means being adapted to a suitable form of closure for the finished container, or to a clamp, the preform 10a is obtained.

Figure 1:
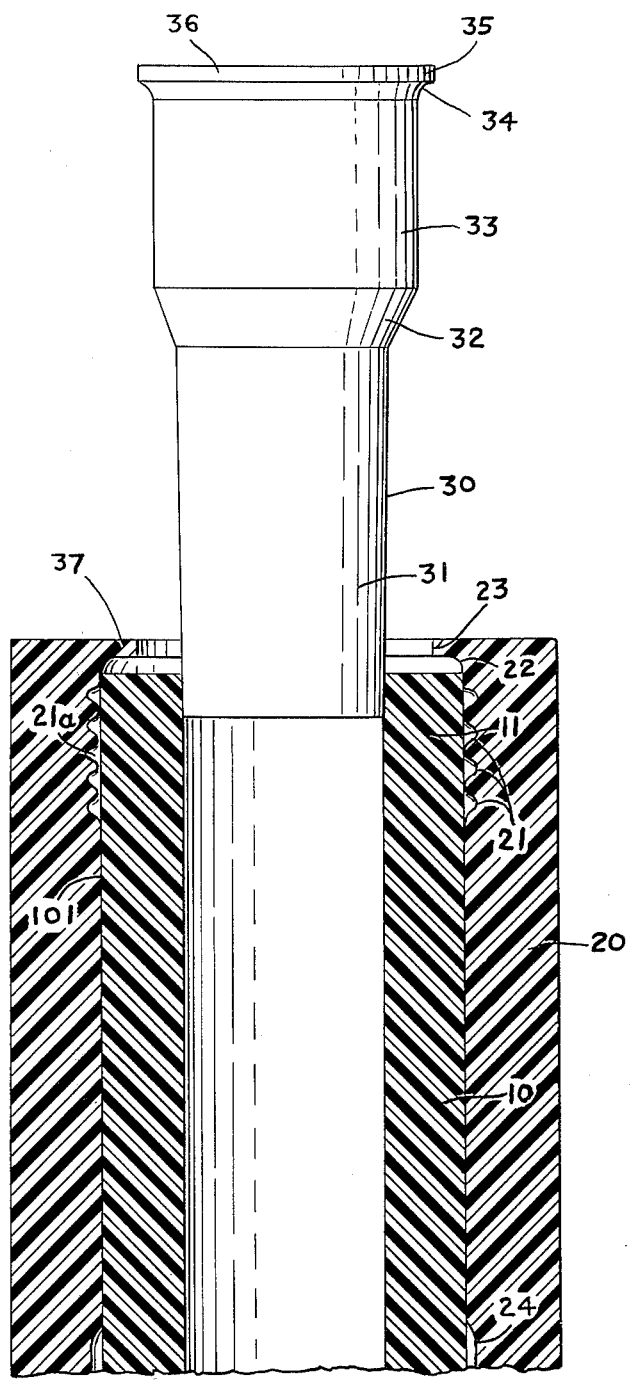
FIG. 1 shows an outer mold section, an inner mold section and a blank during the start of the process for forming the mouthpiece of the preform.
Figure 2:
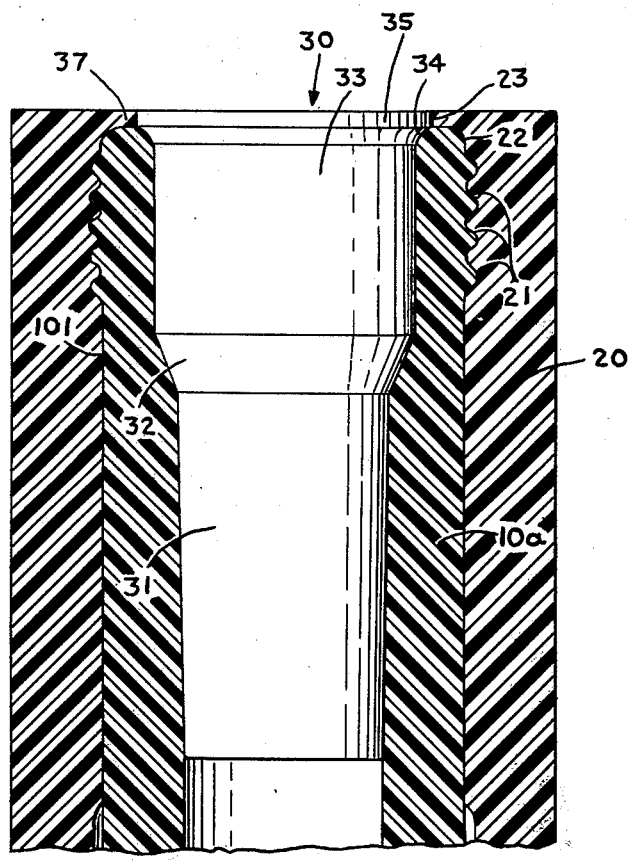
FIG. 2 shows the same parts after forming of the mouthpiece is complete and a preform has been obtained.

For the process of forming a mouthpiece, an outer mold section 20 and an inner mold section 30 are required. The two mold sections are axially movable relative to each other between two end positions. In one of the end positions the inner mold section 30 is outside the outer mold section 20 and the blank 10 is inserted from below. It then abuts with one of its smooth cut surfaces on a rounded surface 22, or on the start thereof (FIG. 1). In the other end position, the inner mold section 30 and the outer mold section 20 enclose the finished preform 10a (FIG. 2).

Adjacent to the inner cylindrical surface 101 the outer mold section is provided with an attachment surface 21 which, in one embodiment of the invention, forms the thread. Adjacent to the attachment surface 21 there is a rounded surface 22. The rounded surface merges with a cylindrical mating surface 23. The cylindrical surface 101 extends to an annular widened portion 24. This widened portion 24 is further from the attachment surface 21 than the depth of penetration of the inner mold section 30 extends when in the end position. In certain embodiments, the outer mold section 20 consists of a plurality of, more particularly two, halves of the mold section which are moved between a position in which the halves of the mold section are closed and a position in which they are speareated from each other. The forming of the mouthpiece from the preform 10a is carried out in the closed position.

The inner mold section 30 consists of a cylindrical surface 33 which merges with a conical surface and then ends in a slightly conical mandrel 31. The mandrel 31 has a relatively small core angle, of between 0.5° and 4°, preferably about 2°. The conical surface 32 encloses an angle of between 3° and 8°, preferably about 5°, with the axis of the inner mold section 30. The cylindrical surface 33 is bounded by a rounded surface 34 which merges with a cylindrical mating surface 35.

The rounded surfaces 22 and 34 are constructed so that, as soon as the inner mold section 30 is in its end position after forming, the surfaces 22 and 34 abut against each other to form a continuous convex surface on the preform 10a. Moreover, the cylindrical mating surface 23 abuts against the cylindrical mating surface 35 and seals off the inner cavity which contains the preform 10a hence preventing the formation of fins or flashing.

The tubular blank 10 is inserted with its cut-off end 11 into the outer mold section 20 so that the smooth cut surface of the blank abuts against the rounded surface 22 of the outer mold section 20. The conical surface 31 prevents the displaced material from passing into the inner cavity of the preform 10a. The dimensions of the blank 10 and outer mold section 20 are adapted to one another so that the blank abuts with its outer surrounding surface closely against the mold 21a of the attachment surface 21 of the outer mold section. A head cup (not shown in the drawings) is mounted at the other end of the blank.

Drive means (not shown in the drawings) guide the inner mold section 30, for example, downwards in the axial direction through the end 11 of the blank 10 which forms the mouthpiece. The conical surfaces 32, 31 meanwhile bring the material in the mouthpiece of the blank radially into the mold 21a of the attachment surface 21, so that the outer mold section 20 comes into progressively firmer engagement with the blank. The head cup (not shown) at the other end of the blank is pushed aside out of its supporting position, when the engagement of the attachment surface 21 on the preform 10 being produced is great enough to absorb the axially directed forces. In the embodiment wherein attachment surface 21 is constructed as a thread, the thread windings of the mouthpiece are formed at the start of the above process.

The blank 10 is then held in stable manner by the attachment surface 21 on the outer mold section 20. With the continued axial movement of the inner mold section 30, the conical surface 32 conveys material from the mouthpiece axially and thus to the other end of the blank which is intended for the container part which is to be blow-molded, and thus elongates the preform 10a being produced.

The cylindrical surface 33 is then pushed into the mouthpiece of the blank and finally assumes its end position (FIG. 2). In the end position, the two cylindrical mating surfaces 23 and 35 abut against each other. The two rounded surfaces 34 and 22 then form a smooth transition from one to the other. This produces a soft, rounded shape on the mouth surface of the preform 10a being produced from the blank 10.

When the preform 10a is finished, the inner mold section 30 is moved back into its original position by drive means and the two-part outer mold section 20 is opened so that the preform 10a can be removed.

Thus, when the mouthpiece of the preform 10a is formed, material is displaced from this area for the mouthpiece. The blank 10 is thereby elongated, and for this reason, when producing preforms according to the invention, the initial length of the blanks should be smaller than according to the processes used hitherto. The displacement of material from the mouthpiece also makes optimum use of all the material of the blank for the preform. Practical tests have shown conclusively that a saving of materials of the order of 8 to 9% is obtained when producing, for example, a bottle intended to store approximately 1 liter of liquid. If this saving is related to the actual mouthpiece, the saving of materials is nearly 30%.

In cases where problems arise when fixing the mouthpiece on the blank 10 to the attachment surface 21 of the outer mold section 20, the friction between the blank and the attachment surface 21 is increased, according to another embodiment of the invention, by providing the blank with a pattern, e.g. knurls or other projecting parts, which engage in a pattern on the attachment surface 21.

What is claimed is:

1. In a process for forming a mouthpiece on a preform formed from a tubular blank of thermoplastic material, adapted for the production of a container, the mouthpiece being formed with connecting means on the outer surface thereof by inserting the blank between an outer mold section having a mold portion for the formation of the connecting means and an inner mold section, the two mold sections being moved relatively axially to force the material of the inserted blank to move radially outwards into the mold portion for the connecting means of the outer mold section, an improvement comprising forming the inner mold section with a first conical surface merging with a second conical surface of greater cone angle in turn merging with a cylindrical surface, the relative movement of said mold sections during molding resulting in axial advance of the inner mold section into the outer mold section with the first conical surface entering the mold section first, the material of said blank being at a temperature not greater than the glass transition temperature and being squeezed between said first and second conical surfaces and said outer mold section to undergo radial compression and deformation into the mold portion during said axial advance of the inner mold section for the connecting means of the outer section to secure the blank to said outer mold section whereupon the second conical section displaces the material in the inner region of the blank axially in the direction of insertion of the inner mold section to reduce the thickness of the mouthpiece in relation to the remainder of the blank while the blank undergoes overall lengthening at its end remote from the mouthpiece and said mouthpiece of the blank is elongated and flows axially in opposite direction to fill the mold when the first mold section is fully inserted into the second mold section, the penetration of said first conical section into said blank during axial advance of said second conical section into said blank preventing displaced material from entering the internal cavity of the blank.

2. A process as claimed in claim 1 wherein said inner and outer mold sections define respective mold cavities which cooperate jointly to shape the axially flowing material of the blank to form a smooth edge for said mouthpiece.

3. A process as claimed in claim 2 wherein the inner mold section is formed with a cylindrical end portion of greater diameter than said cylindrical surface to seal in said outer mold section and cooperate therewith to form said smooth edge without the formation of fins.

4. A process as claimed in claim 3 wherein the respective mold cavities are rounded and cooperatively form said edge of the mouthpiece with a smooth rounded surface.

5. A process as claimed in claim 3 wherein said cylindrical end portion of said inner mold section comes into abutting sealing relation with said outer mold section when the inner mold section is fully inserted into the outer mold section.

6. A process as claimed in claim 5 wherein said inner mold section is formed with a rounded surface extending from said cylindrical end portion to said cylindrical portion to define a rounded shape for the respective said mold cavity and said outer mold section is formed with a rounded surface extending from the portion that comes into abutting sealing relation with the inner mold section, the rounded surfaces of the inner and outer mold sections coming into confronting relation to form a smooth transition from one to the other when the inner mold section is fully inserted into the outer mold section.

7. A process as claimed in claim 1 wherein said connecting means is a thread.

8. A process as claimed in claim 1 wherein said thermoplastic material is selected from the group consisting of polyethylene terephthalate, polyhexamethylene adipamide, polycaprolactam, polyhexamethylene sebacamide, polyethylene-2,6- and 1,5-naphthalate, polytetramethylene-1,2-dioxybenzoate and copolymers of ethylene terephthalate and ethylene isophthalate.

9. A process as claimed in claim 1 comprising supporting said blank at the end thereof remote from said mouthpiece until the blank is secured to said connecting means upon axial advance of said inner mold section into said outer mold section whereupon the support is removed at said end remote from said mouthpiece to permit axial elongation of the blank thereat during further axial advance of said inner mold section into said outer mold section.

* * * * *